United States Patent Office 3,597,459
Patented Aug. 3, 1971

3,597,459
NEW ORGANO-METALLIC PEROXIDIC DERIVATIVES OF MOLYBDENUM AND TUNGSTEN AND THEIR PROCESS OF MANUFACTURE
Hubert Mimoun, Paris, Irénée Seree de Roch, Rueil-Malmaison, Lucien Sajus, Croissy-sur-Seine, and Pierre Menguy, L'Etang-la-Ville, France, assignors to Institut Francais du Petrole des Carburants et Lubrifiants, Rueil-Malmaison, France
No Drawing. Filed Feb. 2, 1968, Ser. No. 702,536
Claims priority, application France, Feb. 7, 1967, 94,063
Int. Cl. C07f *11/00;* C07d *1/08*
U.S. Cl. 260—429  9 Claims

ABSTRACT OF THE DISCLOSURE

Organo-metallic peroxidic derivatives of molybdenum and tungsten having the formula $H_2MO_6,nA$ wherein M is molybdenum or tungsten, A is a carboxylic amide or a phosphoramide and $n$ is 1 or 2. These compounds are prepared by reacting diperoxomolybdic acid or diperoxotungstic acid with said amide A. They are useful as epoxidation agents for olefinic double bonds, either as reactants per se or in small amounts as catalysts used together with hydroperoxides, hydrogen peroxide or oxygen in combination with a 9,10-dihydroxyanthracene.

This invention relates to organo-metallic peroxidic compounds of molybdenum and tungsten and their method of manufacture, as well as their applications, in particular as catalysts for epoxidation of olefinic compounds.

The peroxidic compounds according to the invention comply with the raw formula:

$$H_2MO_6,nA \qquad (I)$$

wherein:

M designates either molybdenum or tungsten,
A designates an amide, substituted or not and $n$ is an integer equal to 1 or 2.

These compounds are accordingly derived from an amide A and diperoxomolybdic or diperoxotungstic acid.

In these compounds, the metal has its maximal valence which is 6 and each molecule contains 2 atoms of active oxygen. This active oxygen can be determined by iodometry or by cerimetry by use of ceric sulphate, for instance according to the method described by F. P. Greenspan and D. G. MacKellar in Anal. Chem. vol. 20, No. 11, 1948, p. 1061.

As examples of compounds according to the invention are to be mentioned:

hexamethylphosphotriamide diperoxomolybdate
N,N-dimethylformamide diperoxomolybdate
N,N-dimethylacetamide diperoxomolybdate
N,N-diphenylformamide diperoxomolybdate
N-methyl N-isobutylbenzamide diperoxomolybdate
N-ethyl N-phenylacetamide diperoxotungstate The amides which are used for manufacturing such compounds are organic or composite amides complying with one of the two formulae:

(a) 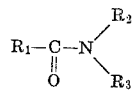

wherein the radical $R_1$ is either hydrogen or a hydrocarbon monovalent radical, containing for instance from 1 to 20 and preferably from 1 to 10 carbon atoms, such as an alkyl, cycloalkyl or aryl radical, and wherein the radicals $R_2$ and $R_3$, identical or different, are either separately each a hydrocarbon monovalent radical containing for example from 1 to 20 and preferably from 1 to 10 carbon atoms, for example alkyl, cycloalkyl or aryl radicals, or form together a divalent radical containing from 5 to 20, and preferably from 5 to 10 carbon atoms, with from 0 to 2 moieties of O, S, NH— or N-alkyl.

(b) 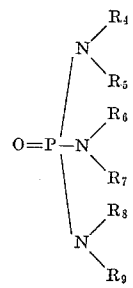

wherein radicals $R_4$ to $R_9$, identical or different, can be hydrocarbon monovalent radicals, particularly alkyl, cycloalkyl or aryl radicals either branched or not, containing for example from 1 to 20 and preferably from 1 to 10 carbon atoms.

Radicals $R_4$, $R_6$ and $R_8$ can also be linked respectively with radicads $R_5$, $R_7$ and $R_9$ in the manner hereabove set forth. Radicals $R_4$ to $R_9$ are, in such a case, defined in the same manner as radicals $R_2$ and $R_3$.

By way of non-limitative examples, there will be mentioned, amongst the amides of the first type: N,N-dimethylformamide, N,N-dimethylacetamide, N,N-dimethylpropionamide, N,N-di-ethylacetamide, N-methyl N-ethyl acetamide, N-methyl N-phenyl formamide, N,N-diphenyl formamide, N-ethyl N-phenyl acetamide, N-ethyl N-methyl benzamide, N-methyl N-isobutyl benzamide, N-acetyl morpholine, N-benzoylpiperidine and N-acetyl N'-methyl piperazine; and amongst the amides of the second type: hexamethyl- and hexapropyl-phosphotriamide, tetramethyl diphenyl phosphotriamide, dimethyl-diethyl-dibutyl-phosphotriamide, hexaethyl phosphotriamide, hexaphenyl phosphotriamide, and the compound of the formula:

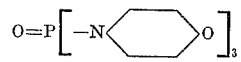

The diperoxidic compounds of the formula $H_2MO_6,nA$ may be prepared, either by action of an amide on a solution, preferably aqueous, of peracid $H_2MO_6$, or by displacement of the nitrogenous base of a peroxidic compound of formula $H_2MO_6,nB$, wherein M represents molybdenum or tungsten and B a nitrogenous heterocyclic base such as piperidine, quinoline, pyridine, 2,2'-bipyridine, acridine, pyrazine, pyrimidine, piperazine, N-alkyl piperazines for example N-methyl or N-butyl piperazine, or their derivatives such as collidines, picolines, or lutidines, $n$ is 1 or 2.

When the preparation is carried out from an aqueous solution of peracid, the amide is preferably used in slight molar excess (1 to 20% for example) with respect to the peracid. When using as starting material a molybdic compound $H_2MO_6,nB$ as previously defined, the amide is preferably used in large excess (for example 20 to 400%) with respect to the compound $H_2MO_6,nB$.

Whatever be the product with which the amide is caused to react, the reaction temperature may be chosen between −20 and 120° C., but is preferably selected within the range of from 5 to 70° C.

During the step of addition of the amide, it is convenient to cool the solution to such an extent as to maintain the temperature within the preferred range, whereby an optimal yield is obtained.

At the end of the reaction, the desired product is obtained by precipitation, either by cooling down the solution (for instance between 5° C. and −50° C.) or by adding to the solution a solvent which causes precipitation of the desired product, or by evaporating water under reduced pressure, these different methods being optionally used in combination.

The resulting products, of the general formula $$H_2MO_6,nA$$

are generally in a crystallized form; however some of them are in the form of a highly viscous solution similar to a paste. These compounds are stable at ambient temperature. They are soluble in a number of solvents such as water, hydrocarbons, alcohols, etc. This solubility makes easier purifications by recrystallization.

The compounds soluble in hydrocarbon solvents are epoxidation agents of olefinic bonds. Considered as reactants, they make it possible to manufacture epoxides with very good yields. When used in small amounts they are excellent catalysts for catalytic epoxidation of unsaturated compounds by use of such oxidizing agents as (a) hydroperoxides, in particular hydrocarbon or secondary alcohol hydroperoxides, (b) hydrogen peroxide and (c) oxygen used in combination with a 9,10-dihydroxyanthracene.

These catalysts have exhibited a better activity than the catalysts containing molybdenum or tungsten, as used heretofore, the reaction velocities and yields being higher.

The hydrogen peroxide, as epoxidation agent, may be used in an aqueous or organic solution. In case of use in an aqueous solution it is preferable, when the olefinic compound is not soluble in water, to dissolve the same in an organic solvent miscible with water, so as to be able to proceed in homogeneous phase, said solvent being for example: a saturated alcohol or polyalcohol of the aliphatic or aromatic series, which may contain in its molecule one or more primary, secondary or tertiary alcohol functions and from 1 to 20 carbon atoms.

There will be mentioned for instance: methanol, ethanol, 1- and 2-propanols, butanols, α-hydroxytoluene, ethylene glycol, erythritol, and 1,2-, 1,3-, or 1,4-bis-hydroxymethyl benzenes; a saturated ketone containing from 3 to 10 carbon atoms, for example acetone, butanone or cyclohexanone; an oxygenated heterocycle such as for example dioxane.

In the case of use of an organic solution of hydrogen peroxide, the solvent can be selected from the above-mentioned alcohols, or the chlorinated solvents such as dichloroethane or chloroform, or the oxygenated heterocycles such as dioxane.

The epoxidation of olefins is conducted within a wide temperature range of for example from +25° C. to 180° C. and preferably between +40° C. and +120° C.

The unsaturated compound may be used in large molar excess with respect to the hydrogen peroxide solution; preferably the volume of unsaturated compound will be substantially equal to the volume of the hydrogen peroxide solution.

At the end of the reaction period, the formed epoxide can be separated from the unreacted olefin and the solvent by distillation or any other known separation technique.

Molecular oxygen, as epoxidation agent, may be used either pure or diluted, for example in the form of air.

9,10-dihydroxyanthracene, either substituted or not, is used preferably in admixture with a solvent which may be, for instance, a mixture of aromatic hydrocarbons with esters of alcohols of the naphthenic series, for example a mixture of xylene with methylcyclohexyl acetate or a mixture of xylene with acetophenone and octanol.

Amongst the various groups which can be substituted on 9,10 anthracene are to be mentioned the alkyl groups containing from 1 to 6 carbon atoms, for example methyl, ethyl, isopropyl, butyl and tert-butyl groups, this list being however not limitative. Preferably there will be used 2-ethyl-9,10 dihydroxyanthracene.

The epoxidation reaction may be carried out:

(a) In two stages comprising a preliminary oxidation of 9,10 dihydroxyanthracene either substituted or not and a subsequent introduction of the catalyst and the olefinic compound.

(b) In a single stage by oxidation of the mixture of 9,10 dihydroxyanthracene with the catalyst and the olefinic compound.

The epoxidation of olefins is conducted at a temperature within a wide range of for instance from +20 to 180° C., preferably between +40 and +120° C.

The unsaturated compound may be present in a large molar excess with respect to the solution of 9,10 dihydroxyanthracene; preferably the unsaturated compound and the solution of 9,10 dihydroxyanthracene will be used at equal volumes.

After completion of the reaction, the formed epoxide is separated by distillation or any other separating means.

In the case of use of hydroperoxide as epoxidation agent, the same operating temperatures as set forth above for the other epoxidation agents, may be used.

The hydroperoxide will advantageously be chosen so as to comply with the formula R—OOH wherein R is an aliphatic, cycloaliphatic or alkyl-aromatic hydrocarbon monovalent radical or a secondary alcohol monovalent radical, said radicals containing advantageously from 3 to 20 carbon atoms.

By way of examples, there will be mentioned cyclohexene, tert-butyl, 4-methyl-2-pentene, cyclohexane, cumene, ethylbenzene, cyclohexanol, methylphenylcarbinol or benzhydrol hydroperoxides.

According to another embodiment of the invention, there may be used, as epoxidation catalysts, a compound of the formula:

(II)  $H_2MO_6,nB$ such as hereabove defined.

The reaction is preferably carried out with use of a hydroperoxide as epoxidation agent, under the same temperature conditions as for the other catalysts mentioned above.

The compounds complying with Formula II may be formed from a nitrogenous heterocyclic organic base and a molybdenum or tungsten peroxide or peracid.

In these compounds molybdenum has an oxidation degree equal to 6. The nitrogenous organic base, as hereabove defined, may also be caused to react with an acid of molybdenum or tungsten so as to obtain the corresponding salt; this salt is then oxidized by means of a conventional oxidizing agent such as hydrogen peroxide so as to be converted to a peroxy salt.

R. G. Beiles and R. A. Safina in "Russian Journal of Inorganic Chemistry," volume 6, No. 7, pages 825 to 827, prepare in particular pyridine peroxomolybdate by action of hydrogen peroxide on ammonium molybdate in solution and treatment of the resulting product with pyridine.

Although this is not necessary, one can use a solvent for the olefin. When epoxidation is carried out in the presence of a solvent, there will be generally used substituted amides such as dimethylacetamide, dimethylformamide and more particularly hexamethyl phosphotriamide.

The epoxidation process according to the invention may be used for obtaining epoxides from olefinic compounds containing, for example, from 3 to 20 carbon atoms per molecule, and which may be, for example: aliphatic olefins such as propylenes, butenes, isobutene or hexenes; cycloolefins, e.g. cyclopentene, cyclohexene and cyclooctene; alkyl and alkenyl cycloolefins, for example methylcyclohexene, methylcyclopentene and vinylcyclohexene; alkenyl aromatic hydrocarbons, for instance styrene, vinyltoluene and methylstyrene; conjugated or non-conjugated diolefins and polyolefins, for instance 1,5-cyclooctadiene, 1,5,9-cyclododecatriene, 1,4-cyclohexadiene, 1,3-cyclohexadiene and butadiene; olefinic alcohols, for instance allyl alcohol, methylvinylcarbinol or cyclohexenol.

The following Examples 1 to 4, which are not limitative, describe new molybdenum and tungsten peroxidic compounds and their processes of manufacture. Examples 5 to 12 and 15 illustrate the use of said compounds as epoxidation catalysts. Finally, Examples 13 and 14 illustrate the use of per salts of heterocyclic bases of the formula $H_2MO_6,nB$.

EXAMPLE 1

Diperoxomolybdic acid $H_2MoO_6$ is prepared by dissolving molybdic anhydride into hydrogen peroxide. 70 gr. of $MoO_3$ (0.486 mol.) are contacted with 300 gr. of hydrogen peroxide solution at a 30% by weight concentration.

The molybdic anhydride suspension is stirred and brought to a temperature of from 40° C. to 50° C. until substantially complete consumption of the molybdic anhydride. The solution, after filtration on fritted glass, is then cooled down to the ambient temperature of 20–25° C. To the so-cooled solution are slowly added, while stirring and maintaining the tempertture at 25° C., about 88 gr., i.e. 0.495 mole of hexamethylphosphotriamide.

There is obtained a yellow precipitate which is rapidly filtered, washed with water and ether and then dried under vacuum in a desiccator containing phosphoric anhydride.

The resulting product may be recrystallized in various solvents such as, for example, ethyl alcohol, chloroform, methylene chloride, acetonitrile, etc. according to conventional technics.

By this preparation, there were obtained 149 gr. of final product, corresponding to a yield of 82% with respect to the theoretical amount. The determinations of the molecular weight, the active oxygen and elementary analysis, have shown that the product complies with the formula:

$$H_2MoO_6,OP[N(CH_3)_2]_3$$

EXAMPLE 2

50 gr. of tungstic acid (0.20 mol.) are dissolved into 140 gr. of hydrogen peroxide at a 30% concentration. When the dissolution is achieved, there are added to the solution of diperoxotungstic acid 41 gr. of hexamethylphosphoramide, i.e. 0.23 mole. There are obtained 81 gr. of final product in the form of a white crystallized solid, which corresponds to a yield of 88%.

By analysis as hereabove stated, this product was found to comply with the formula:

$$H_2WO_6,OP[N(CH_3)_2]_3$$

EXAMPLE 3

The preparation of the permolybdic acid solution is carried out under the same conditions as according to Example 1. There are caused to react 72 gr. of $MoO_3$, i.e. 0.5 mole, with 310 gr. of hydrogen peroxide at a 30% concentration.

To the peracid solution are added 81 gr. of dimethylformamide (DMF), i.e. 1.1 mole, while maintaining the temperature at 30° C. After one hour, the solution is concentrated by evaporation under vacuum: the product precipitates. The crystallized compound is washed with water and with ethyl ether and is recrystallized in ethanol. The resulting product is dried under vacuum. There are so obtained 145 g. of final product, which corresponds to a yield of 85%, said final product complying with the formula:

$$H_2MoO_6,2DMF$$

EXAMPLE 4

The peroxidic compound is prepared by displacement of the quinoline of the diperoxo molybdate of the raw formula:

$$C_9H_7N,H_2MoO_6$$

64 g. of quinoline diperoxo-molybdate, i.e. 0.198 mole, are dissolved into 85 gr. i.e. 0.475 mole of hexamethyl phosphoramide, at a temperature of 25–30° C. while stirring by means of a magnetic stirrer. When the solution is homogeneous, there are progressively added 200 cc. of ethyl ether. The resulting solution is cooled down to about 0° C. and the desired product so precipitated.

After washing and drying as in Example 1, there are obtained 41 gr. of diperoxo-molybdate identical to that prepared in Example 1, which corresponds to a yield of 55%.

EXAMPLE 5

To 2 gr. of an aqueous solution of hydrogen peroxide at a concentration of 80% by weight are added 100 cc. of dioxane, 80 gr. of cyclohexene and 0.1 gr. of hexamethylphosphorotriamide diperoxomolybdate; the pH is adjusted to a value comprised between 3 and 5.

After stirring for 4 hours at 61° C. under nitrogen atmosphere with consumption of the active oxygen and thereafter distillation of the reaction medium, there are obtained 4.1 gr. of 1,2-epoxy cyclohexane, which corresponds to a molar yield of 89% with respect to the reacted cyclohexene.

EXAMPLE 6

To 50 gr. of a hydrogen peroxide solution at a 1% by weight concentration in 1,2-dichloro ethane, are added 40 gr. of cyclohexene and 0.1 gr. of dimethylformamide diperoxomolybdate.

After stirring for three hours at 50° C. under nitrogen atmosphere, there are recovered by distillation 1.31 gr. of 1,2-epoxycyclohexane, corresponding to a molar yield of 90% with respect to the reacted cyclohexene.

EXAMPLE 7

Example 5 is repeated except that cyclohexene is replaced by 60 gr. of propylene and the reaction conducted at 72° C. There are obtained 2.4 gr. of 1,2 epoxypropane, corresponding to a molar yield of 87% with respect to the reacted propylene.

EXAMPLE 8

To 100 gr. of an aqueous solution of hydrogen peroxide at a 10% by weight concentration, are added 20 gr. of allyl alcohol and 0.1 gr. of hexamethylphosphorotriamide diperoxomolybdate. The mixture is brought and maintained for two hours and a half at 50° C. There are obtained 18.5 gr. of glycidol, corresponding to a yield of 84% with respect to the reacted allyl alcohol.

EXAMPLE 9

To 100 gr. of a solution, at a concentration of 9.52% by weight, of 2-ethyl-9,10-dihydroxy-anthracene in a mixture of xylene with methylcyclohexyl acetate, there are added 80 gr. of cyclohexene and 0.1 gr. of hexamethylphosphorotriamide diperoxomolybdate. After stirring for two hours at 50° C. in oxygen atmosphere there is observed a consumption of 1,000 cc. of oxygen, measured at 42° C. under a pressure of 760 mm. of mercury. 3.5 gr. of 1,2-epoxycyclohexane are recovered by distillation, which corresponds to a yield of 91.5% with respect to the reacted cyclohexene.

EXAMPLE 10

There are introduced into a reaction vessel 100 gr. of a solution, at a concentration of 9.52% by weight, of 2-ethyl-9,10-dihydroxyanthracene in a mixture of xylene with methylcyclohexyl acetate. This solution is oxidized by air while stirring at 40° C. A consumption of 820 cc. of oxygen has been measured under a pressure of 915 mm. of mercury at a temperature of 42° C.

To this oxidized solution are added 80 gr. of cyclohexene and 0.1 gr. of the catalyst used in Example 9.

After two hours of reaction, 3.6 gr. of 1,2-epoxycyclohexane are recovered by distillation, which corresponds to a yield of 95% with respect to the reacted cyclohexene.

EXAMPLE 11

Into a reaction vessel are introduced 150 gr. of a solution of 2-ethyl-9,10-dihydroxyanthracene at a concentration of 8% by weight in a mixture of xylene with methylcyclohexyl acetate. This solution is stirred at 30° C. in the presence of oxygen. 1,230 cc. of oxygen, measured at a temperature of 27° C. under a pressure of 760 mm. of mercury, have been consumed. To this solution are added 110 gr. of 1-octene and 0.1 gr. of the catalyst used in Example 9 and the resulting mixture is kept at 20° C. for four hours. There are recovered from the reaction vessel 5.1 gr. of 1,2-epoxyoctane, which corresponds to a yield of 80.7% with respect to the reacted 1-octene.

EXAMPLE 12

120 gr. of a solution of 2-ethyl-9,10-dihydroxyanthracene at a concentration of 8% by weight in a mixture of xylene with methylcyclohexyl acetate are admixed with 100 gr. of allyl alcohol with 0.2 gr. of the same catalyst as used in Example 9. The reaction medium is stirred under oxygen atmosphere for 6 hours and a half. 968 cc. of oxygen, as measured at a temperature of 20° C. under 760 mm. of mercury, are consumed. There are obtained, after distillation, 2.6 gr. of glycidol, which corresponds to a yield of 86% with respect to the reacted allyl alcohol.

EXAMPLE 13

There are added 0.016 mole of piperidine diperoxomolybdate $PiH_2MoO_6$, to 120 gr. of 1-octene. The mixture is brought to 100° C. and to the reaction medium is added a solution of ethylbenzene hydroperoxide in o-dichlorobenzene (with a 90% by volume hydroperoxide content).

This solution is introduced at a rate of 0.3 mole of hydroperoxide per hour. After two hours from the beginning of the test 0.56 mole of 1,2-epoxyoctane was formed. During the test the piperidine diperoxomolybdate content remained unchanged since the hydroperoxide has reoxidized, as it was formed, the per salt which had been previously reduced to piperidine molybdate by the olefin. The molar yield, with respect to the converted 1-octene was 91%.

EXAMPLE 14

To 164 gr. of cyclohexene are added 0.018 mole of pyridine diperoxotungstate and the resulting mixture is brought to 80° C. To the reaction medium is added an ethylbenzene hydroperoxide solution with an 87% by weight hydroperoxide content, the remainder consisting essentially of acetophenone and phenyl-methyl carbinol. The peroxidic solution is introduced into the reaction vessel at a rate of 0.25 mole of hydroperoxide per hour. After two hours of reaction there was formed 0.43 mole of 1,2-epoxycyclohexane. During the test the pyridine diperoxotungstate content remained substantially constant. The yield attained 90% with respect to the converted cyclohexene.

EXAMPLE 15

Example 14 is repeated except that pyridine diperoxotungstate is replaced by hexamethylphosphoramide diperoxotungstate of the formula:

$$H_2MoO_6HMPT$$

The yield is unchanged.

What is claimed as this invention is:

1. A compound of the general formula $H_2HO_6,nA$ 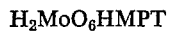 wherein M is selected from the group consisting of tungsten and molybdenum $n$ is 1 or 2 and A is a phosphoramide of the general formula:

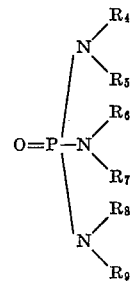

wherein $R_4$ to $R_9$ each consists of a monovalent hydrocarbon radical containing from 1 to 20 carbon atoms or wherein each of the respective pairs of radicals $R_4R_5$, $R_6R_7$ and $R_8R_9$ forms a divalent hydrocarbon radical containing from 5 to 20 carbon atoms.

2. Hexamethylphosphoramide diperoxomolybdate.

3. Hexamethylphosphoramide diperoxotungstate.

4. A process for preparing the compound of claim 1 which comprises reacting said phosphoramide A with diperoxomolybdic acid or diperoxotungstic acid.

5. A process for preparing the compound of claim 1 which comprises reacting said phosphoramide A with a salt formed between diperoxomolybdic acid or diperoxotungstic acid and a nitrogenous heterocyclic base selected from the group consisting of piperidine, quinoline, pyridine, 2,2'-bipyridine, acridine, pyrazine, pyrimidine, piperazine, N-alkylpiperazine, collidine, picoline and lutidine.

6. The proecss of claim 4, wherein a 1 to 20% molar excess of said phosphoramide is employed.

7. The process of claim 5, wherein a 20 to 400% molar excess of said phosphoramide is employed.

8. The process of claim 4, wherein the reaction is carried out at a temperature of −20° to 120° C.

9. The process of claim 5, wherein the reaction is carried out at a temperature of −20° to 120° C.

References Cited

UNITED STATES PATENTS

| | | | |
|---|---|---|---|
| 3,434,975 | 3/1969 | Sheng et al. | 252—431 |
| 3,480,563 | 11/1969 | Bonetti et al. | 252—431 |
| 3,489,775 | 1/1970 | De Roch et al. | 260—348.5 |

OTHER REFERENCES

Beiles et al. (I): Chem. Abst. vol. 56 (1962), column 6892.

Beiles et al. (II): Chem. Abst. vol. 63 (1965), column 14354–5.

Fields: J. Am. Chem. Soc., 80 (1959), pp. 3358–62.

Schafer et al.: Inorganic Chem., vol. 4 (1965), pp. 623–5.

JAMES E. POER, Primary Examiner

A. P. DEMERS, Assistant Examiner

U.S. Cl. X.R.

252—431; 260—242, 270, 348.5